(12) United States Patent
Liu et al.

(10) Patent No.: US 12,055,817 B1
(45) Date of Patent: Aug. 6, 2024

(54) DISPLAY MODULES AND DISPLAY APPARATUSES

(71) Applicant: Wuhan China Star Optoelectronics Technology Co., Ltd., Hubei (CN)

(72) Inventors: Fancheng Liu, Hubei (CN); Guowei Zha, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/474,425

(22) Filed: Sep. 26, 2023

Related U.S. Application Data (63) Continuation of application No. PCT/CN2023/112748, filed on Aug. 11, 2023.

(30) Foreign Application Priority Data

Aug. 4, 2023 (CN) .......................... 202310982427.5

(51) Int. Cl.
*G02F 1/13357* (2006.01)
*G02F 1/1335* (2006.01)
*G02F 1/1343* (2006.01)

(52) U.S. Cl.
CPC .... *G02F 1/13362* (2013.01); *G02F 1/133504* (2013.01); *G02F 1/133528* (2013.01); *G02F 1/133606* (2013.01); *G02F 1/133611* (2013.01); *G02F 1/134309* (2013.01); *G02F 1/13439* (2013.01)

(58) Field of Classification Search
CPC ........... G02F 1/13439; G02F 1/134309; G02F 1/133611; G02F 1/133606; G02F 1/133528; G02F 1/133504; G02F 1/13362
See application file for complete search history.

(56) References Cited

U.S. PATENT DOCUMENTS 6,147,734 A * 11/2000 Kashima ........... G02F 1/133528
349/162
2005/0036082 A1 2/2005 Lai
(Continued)

FOREIGN PATENT DOCUMENTS

CN 104885005 A 9/2015
CN 110297367 A 10/2019
(Continued)

OTHER PUBLICATIONS

International Search Report in International application No. PCT/CN2023/112748, mailed on Apr. 29, 2024.
(Continued)

*Primary Examiner* — Mariam Qureshi
(74) *Attorney, Agent, or Firm* — Nathan & Associates; Menachem Nathan (57) ABSTRACT

In a display module, light transmitted from a first light modulation component is first polarized light. Light transmitted from a light modulation region of a second light modulation component corresponding to a light-emitting region in a extinguishing state is second polarized light, and light transmitted from a light modulation region of the second light modulation component corresponding to a light-emitting region in a light-emitting state is third polarized light. A first polarizer is disposed on a side of the second light modulation component away from the first light modulation component.

20 Claims, 8 Drawing Sheets

(56) References Cited

U.S. PATENT DOCUMENTS

2016/0320640 A1   11/2016  Han
2017/0285420 A1*  10/2017  Okuyama ........... G02F 1/13737
2018/0272950 A1    9/2018  Anzai

FOREIGN PATENT DOCUMENTS

| CN | 110361899 A | 10/2019 |
|---|---|---|
| CN | 110928036 A | 3/2020 |
| CN | 115509039 A | 12/2022 |
| DE | 102020216016 B3 | 1/2022 |
| JP | 2007219172 A | 8/2007 |
| TW | 200813924 A | 3/2008 |

OTHER PUBLICATIONS

Written Opinion of the International Search Authority in International application No. PCT/CN2023/112748, mailed on Apr. 29, 2024.
German Office Action issued in corresponding German Patent Application No. 11 2023 000 047.6 dated Mar. 8, 2024, pp. 1-8.

* cited by examiner

DISPLAY MODULES AND DISPLAY APPARATUSES

CROSS-REFERENCE TO RELATED APPLICATIONS

This application is a continuation of International Application No. PCT/CN2023/112748, filed on Aug. 11, 2023, which claims priority to Chinese Patent Application No. 202310982427.5 filed on Aug. 4, 2023. The disclosures of the above applications are incorporated herein by reference in their entireties.

TECHNICAL FIELD

The present application relates to display technologies, and in particular, to display modules and display apparatuses.

BACKGROUND

If a response time of liquid crystal molecules is fixed, the higher a refresh frequency and the higher a resolution of a display module, the less an available duty cycle of a backlight.

A display panel can use a progressive scan backlight. Within one frame, the liquid crystal turns in order. When the scan proceeds to a lower part of the display panel, liquid crystal molecules in an upper part thereof have completed turning. At this time, backlight corresponding to the upper part of the display panel is turned on, and backlight corresponding to the lower part of the display panel remains turned off, thereby reducing motion blur caused by delay in liquid crystal turning.

However, for mini light-emitting diode (LED) displays and micro-LED displays, there is a halo problem with backlight scanning solutions. For example, when the mini-LED displays and the micro-LED displays are applied in the field of virtual reality, a size of the display panel is small and thus an area of the display panel with halo diffusion has a large ratio, so that the turning process of the liquid crystal at the halo diffusion position is easily observed by a naked eye, which causes motion blur of a dynamic image and affects a display effect.

SUMMARY

According to one aspect, one or more embodiments of the present application provides a display module, including a light-emitting substrate, a first light modulation component, a second light modulation component, an array substrate, and a first polarizer, where the light-emitting substrate includes a plurality of light-emitting regions; and the first light modulation component is disposed on a light exit side of the light-emitting substrate, and light transmitted from the first light modulation component is a first polarized light; the second light modulation component is disposed on a side of the first light modulation component away from the light-emitting substrate, wherein the second light modulation component has a plurality of light modulation regions disposed respectively corresponding to the light-emitting regions, light transmitted from one or more of the light modulation regions respectively corresponding to one or more of the light-emitting regions in a extinguishing state is second polarized light, and light transmitted from one or more of the light modulation regions respectively corresponding to one or more of the light-emitting regions in a light-emitting state is third polarized light; and the array substrate is disposed on a side of the second light modulation component away from the first light modulation component; and the first polarizer is disposed on the side of the second light modulation component away from the first light modulation component; where a vibration direction of the first polarized light is not parallel to a vibration direction of the second polarized light and is parallel to a vibration direction of the third polarized light, and the vibration direction of the second polarized light is not parallel to a polarization direction of the first polarizer.

According to another aspect, one or more embodiments of the present application further provides a display apparatus, including a frame and a display module, where the display module includes a light-emitting substrate, a first light modulation component, a second light modulation component, an array substrate, and a first polarizer, where the light-emitting substrate includes a plurality of light-emitting regions; and the first light modulation component is disposed on a light exit side of the light-emitting substrate, and light transmitted from the first light modulation component is a first polarized light; the second light modulation component is disposed on a side of the first light modulation component away from the light-emitting substrate, wherein the second light modulation component has a plurality of light modulation regions disposed respectively corresponding to the light-emitting regions, light transmitted from one or more of the light modulation regions respectively corresponding to one or more of the light-emitting regions in a extinguishing state is second polarized light, and light transmitted from one or more of the light modulation regions respectively corresponding to one or more of the light-emitting regions in a light-emitting state is third polarized light; and the array substrate is disposed on a side of the second light modulation component away from the first light modulation component; and the first polarizer is disposed on the side of the second light modulation component away from the first light modulation component; where a vibration direction of the first polarized light is not parallel to a vibration direction of the second polarized light and is parallel to a vibration direction of the third polarized light, and the vibration direction of the second polarized light is not parallel to a polarization direction of the first polarizer.

DETAILED DESCRIPTION

Some embodiments of the present application will be described in detail below with reference to the accompanying drawings. The embodiments are described for illustrative purposes only and are not intended to limit the present application.

Figure 1:
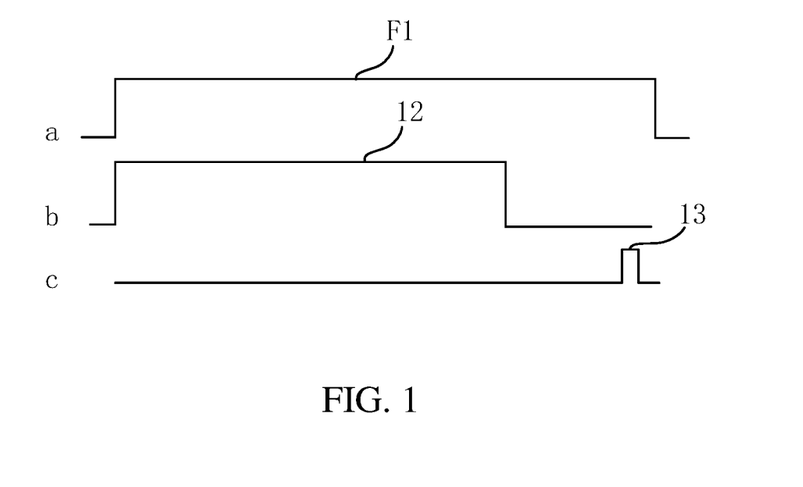
FIG. 1 is a schematic timing diagram of backlight drive in the related art.

As shown in FIG. 1, an example in which the display has a 2.56 inch, a resolution of 1700, and a refresh frequency of 90 hz is used. Duration of each picture frame F1 in a data signal a is 11.1 ms, scanning time of each line in a scanning signal b is 3.56 μs, and duration of a total scanning 12 s is a product of 3.56 μs and the number of lines. A duty cycle of backlight on duration (that is, a proportion of the backlight pulse in the picture frame in FIG. 1) in a backlight signal 13 is less than 5% or even less than 1%, and switching on/off of the backlight is difficult to implement.

Figure 2:
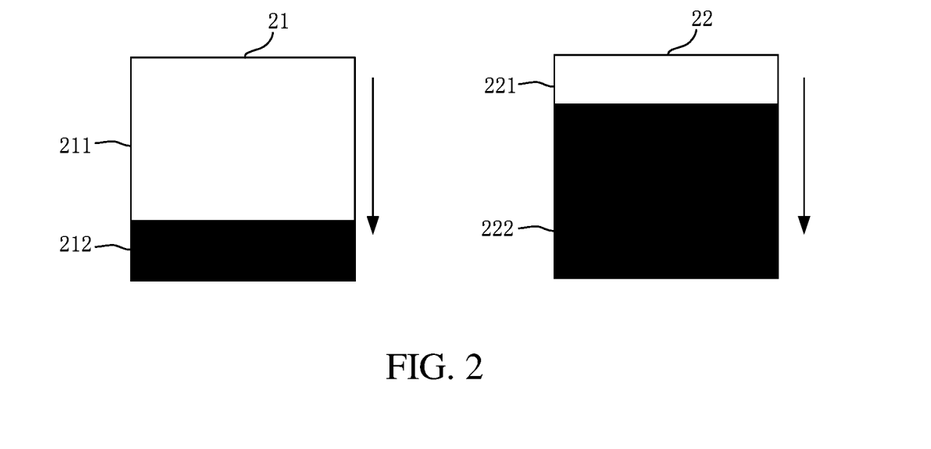
FIG. 2 is a schematic diagram of backlight scanning in the related art.

As shown in FIG. 2, when the scan proceeds to a lower part 212 of a panel 212, a sub-pixel of an upper part 211 has completed the turning. In this case, the upper part 221 of the backlight is turned on, and the lower part 222 of the backlight remains off, thereby reducing motion blur caused by delay in liquid crystal turning.

However, for a mini-LED display, a backlight scanning solution may have a halo problem. For example, the mini-LED is applied to the field of virtual reality (VR). Because a panel size is small and is usually 2 inch-2.5 inch, a proportion of all halo diffusion in an overall panel is large, so that a turning process of liquid crystal at a diffusion position is easily observed by a naked eye, and serious motion blur occurs, which causes poor display quality of a picture.

Figure 3:
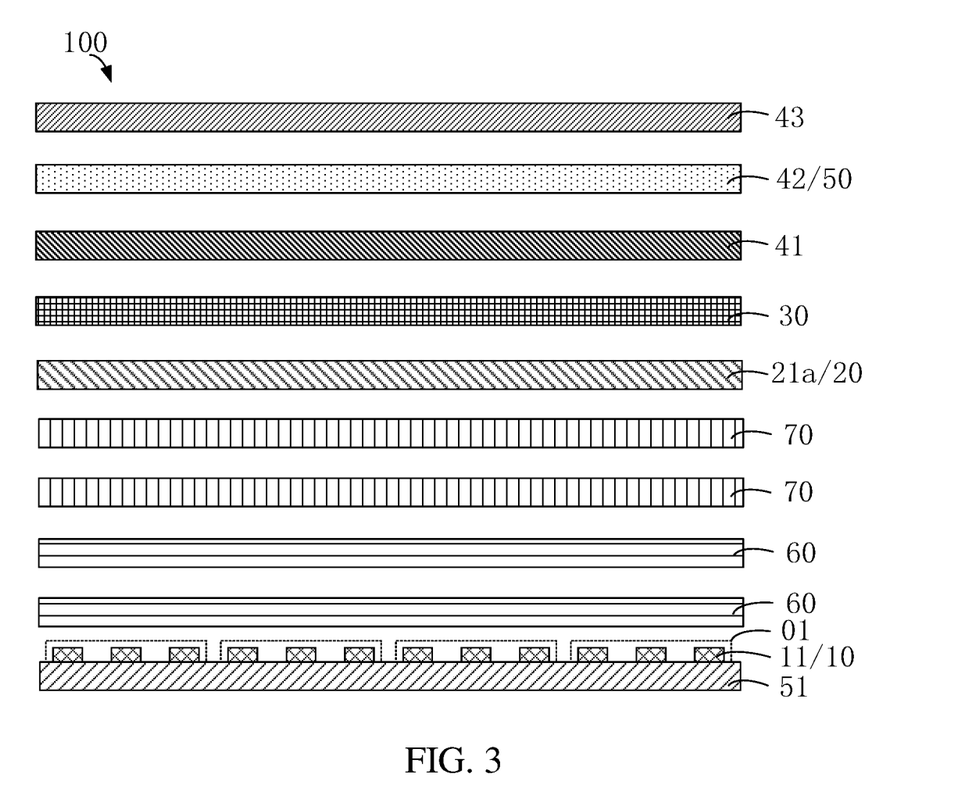
FIG. 3 is a schematic diagram of a display module of a first structure according to one or more embodiments of the present application.
Figure 4:
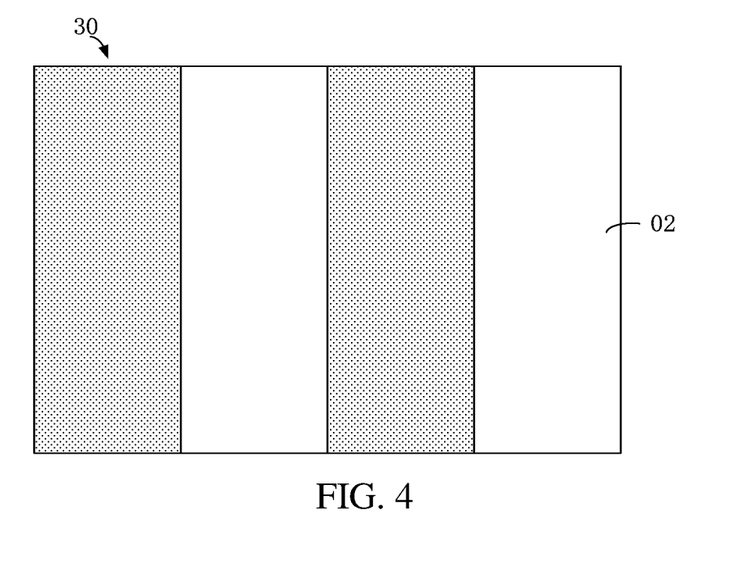
FIG. 4 is a schematic diagram of a second light modulation component in the display module as shown in FIG. 3.

As shown in FIG. 3 and FIG. 4, an embodiment of the present application provides a display module 100, including: a light-emitting substrate 10, a first light modulation component 20, a second light modulation component 30, a first polarizer 41, and an array substrate 42. Specifically, the display module 100 includes a liquid crystal cell 50, and the liquid crystal cell 50 includes the array substrate 42, a liquid crystal layer, and an opposite substrate opposite to the array substrate 42.

The light-emitting substrate 10 includes a plurality of light-emitting regions 01, where the light-emitting regions 01 are configured to present a light-emitting state or an extinguishing state. Specifically, in a same scanning period, some of the plurality of light-emitting regions 01 are in an extinguishing state, and some of the light-emitting regions 01 are in a light-emitting state.

The first light modulation component 20 is disposed on a light exit side of the light-emitting substrate 10, and light transmitted from the first light modulation component 20 is a first polarized light. The second light modulation component 30 is disposed on a side of the first light modulation component 20 away from the light-emitting substrate 10. The second light modulation component 30 includes a plurality of light modulation regions 02, and the light modulation region 02 is disposed correspondingly to the light-emitting region 01.

The light transmitted from the second light modulation component 30 of the light modulation region 02 corresponding to the light-emitting region 01 in the extinguishing state is a second polarized light, and the light transmitted from the second light modulation component 30 of the light modulation region 02 corresponding to the light-emitting region 01 in the light-emitting state is a third polarized light.

The light transmitted from the first polarizer 41 is a first polarized light. The array substrate 42 is disposed on a side of the second light modulation component 30 away from the first light modulation component 20. The first polarizer 41 is disposed on a side of the second light modulation component 30 away from the first light modulation component 20. Specifically, the first polarizer 41 is disposed on a side of the array substrate 42 close to the second light modulation component 30.

The display module further includes a second polarizer 43. The second polarizer 43 is disposed on a side of the array substrate 42 away from the second light modulation component 30.

The vibration direction of the first polarized light is not parallel to the vibration direction of the second polarized light. The vibration direction of the first polarized light is parallel to the vibration direction of the third polarized light. The vibration direction of the second polarized light is not parallel to a polarization direction of the first polarizer.

In the display module 100 provided in one or more embodiments of the present application, the first light modulation component 20 is disposed to transmit the first polarized light, and the second light modulation component 30 is disposed to enable the light modulation region 02 corresponding to the light-emitting region 01 in the extinguishing state to transmit the second polarized light, so that the light modulation region 02 corresponding to the light-emitting region 01 in the light-emitting state to normally transmit the third polarized light. The first polarizing plate 41 is disposed to transmit the third polarized light, to provide light required for display in the display area. The first polarizing plate 41 is further configured to absorb the second polarized light, so as to avoid halo diffusion to the to-be-displayed area. That is, a dynamic adjustment of the light modulation region 02 is set to match a panel scanning and a backlight scanning process, so as to dynamically control a diffusion width of the halo, improve a dynamic image motion blur, and improve a display effect.

As shown in FIG. 4, the second light modulation component 30 is divided into a plurality of light modulation regions 02. Specifically, the light-emitting regions are disposed in a one-to-one correspondence with the light modulation regions 02. The widths of the plurality of light modulation regions 02 may be equal or not equal.

In one or more embodiments of the present application, the first light modulation component includes a dual brightness enhancement film (DBEF) 21a. The DBEF 21a is used to convert light from a display light provided by the light-emitting substrate 10 whose vibration direction is perpendicular to a light transmission axis of the DBEF 21a into first polarized light. Specifically, a direction of the light transmission axis of the DBEF 21a is 0 degrees. That is, by using the DBEF 21a, light whose vibration direction is perpendicular to the light transmission axis of the DBEF 21a in the display light provided by the light-emitting substrate 10 can be converted into horizontally polarized lights by multiple times of reflection, and these horizontally polarized lights pass through the first polarizer 41, thereby improving backlight display luminance.

In one or more embodiments of the present application, the light-emitting substrate 10 includes a plurality of light-emitting devices 11 arranged in an array, and the light-emitting devices 11 include a light-emitting diode or a mini light-emitting diode.

In one or more embodiments of the present application, the display module further includes a lamp board 51, the light-emitting substrate 10 is located on one side of the lamp board 51, and the lamp board 51 is configured to carry the light-emitting substrate 10.

In one or more embodiments of the present application, the display module further includes a diffuser 60 and a brightness enhancement film 70. The diffuser 60 is disposed on a light exit side of the light-emitting substrate 10, and the brightness enhancement film 70 is disposed on a side of the diffuser 60 away from the light-emitting substrate 10.

In one or more embodiments of the present application, the diffuser 60 mainly includes a three-layer structure, including a scratch-resistant layer of a lowermost layer, a transparent polyester substrate layer of a middle layer, and a diffusion layer of an uppermost layer. A working principle of the diffuser 60 is as follows: light is incident from a scratch-resistant layer of a lowermost layer, then penetrates a highly transparent polyester substrate, and then is scattered by diffusion particles dispersed in the diffusion coating to form a uniform surface light source. Most of the diffusion particles are spherical, and a function of the diffusion particles is similar to that of a convex lens. When light passes through these particles, the light is focused to a certain exit angle, so as to achieve a function of enhancing luminance of the exit light. In addition, particles with different particle sizes in the diffusion layer also ensure that light does not directly radiate out of the diffuser 60, thereby achieving an atomization effect.

In one or more embodiments of the present application, the diffuser 60 includes a bottom diffuser and a top diffuser. The bottom diffuser is close to the light-emitting substrate 10, and is configured to convert the non-uniform light source emitted from the light-emitting substrate 10 into a plane light source that is evenly distributed and blurred, and also plays a role of shielding a printed dot or another optical defect. The top diffuser is disposed on a side of the bottom diffuser away from the light-emitting substrate 10. It has a high light penetration capability. It may improve a viewing angle, increase light source softness, and functions as a diffusion and protection brightness enhancement film 70.

In one or more embodiments of the present application, the brightness enhancement film 70 may be a single layer or a plurality of layers, and two layers are disposed in the brightness enhancement film 70 in the present application. The brightness enhancement film 70 is also referred to as a prism film according to a product microscopic prism structure of the brightness enhancement film 70. An implementation process of modifying a light direction according to the brightness enhancement film 70 to implement a brightness enhancement effect may also be referred to as a brightness enhancement film, and is also often referred to as brightness enhancement film (BEF) for short. The brightness enhancement film 70 is a transparent optical film, and includes a three-layer structure. An in-light surface of a lowermost layer needs to provide a certain haze by means of back coating, an intermediate layer is a transparent polyester base material layer, and an out-light surface of an uppermost layer is a micro prism structure. A working principle of the brightness enhancement film 70 is as follows: a light source passes through the in-light surface and a transparent polyester substrate layer, and when the prism layer penetrates a fine prism structure on a surface of the prism layer, refraction, total reflection, light accumulation, and the like are performed to control light intensity distribution, so that light scattered by the light source concentrates toward the front, and unutilized light outside a viewing angle is recycled by reflecting the light. Therefore, a light loss is reduced, overall luminance and uniformity is improved. An effect of increasing luminance and controlling the viewing angle of display panel is performed.

Figure 5:
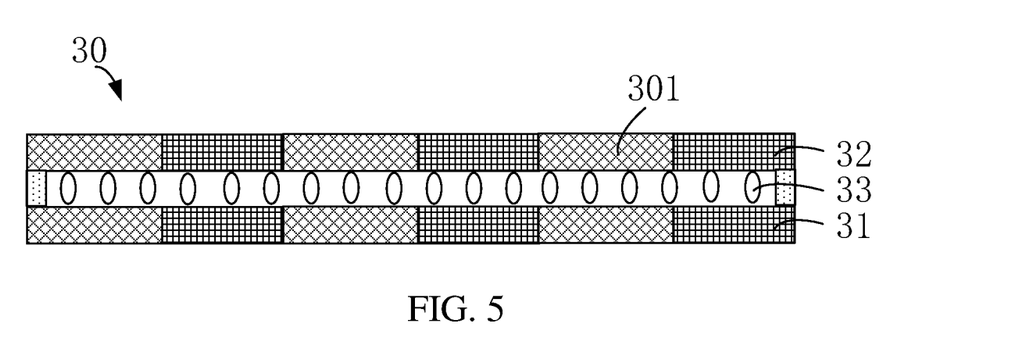
FIG. 5 is a cross-sectional view of the second light modulation component in the display module as shown in FIG. 3.

As shown in FIG. 5, the second light modulation component 30 includes a first electrode layer 31 and a second electrode layer 32. The first electrode layer 31 is disposed opposite to the second electrode layer 32. The display module further includes a liquid crystal layer 33, where the liquid crystal layer 33 is located between the second light modulation component 30 and the first polarizer 41. The liquid crystal layer 33 is disposed between the first electrode layer 31 and the second electrode layer 32. The liquid crystal layer 33 includes a plurality of liquid crystal molecules, and the liquid crystal molecules deflect under an electric field formed by the first electrode layer 31 and the second electrode layer 32, to change a deflection angle, so as to adjust and control light. Specifically, an insulating transparent film layer may be disposed on a side of the first electrode layer 31 and the second electrode layer 32 away from the liquid crystal layer 33, so as to protect the first electrode layer 31 and the second electrode layer 32 from external interference.

In one or more embodiments of the present application, both the first electrode layer 31 and the second electrode layer 32 include a plurality of transparent electrodes 301. The transparent electrodes 301 located in different light modulation regions 02 are respectively connected to different voltage output terminals. The voltage output terminals are configured to output a deflection voltage to the transparent electrodes 301. Therefore, the deflection angle of the liquid crystal molecules in each light modulation regions 02 is independently controlled, so as to dynamically control the diffusion width of the halo. It improves a dynamic image motion blur, and improves a display effect. Specifically, the transparent electrode 301 located in the same light modulation region 02 is connected to a same voltage output terminal.

In one or more embodiments of the present application, the light modulation regions 02 have a first state and a second state. When the light-emitting region 01 is in the light-emitting state, the light modulation regions 02 corresponding to the light-emitting region 01 are in the first state. When the light-emitting region 01 is in the extinguishing state, the light modulation regions 02 corresponding to the light-emitting region 01 are in the second state. Under control of the deflection voltage, a phase delay difference between a light transmitted through a part of the light modulation region 02 in the first state in the second light modulation component and a light transmitted through a part of the light modulation region 02 in the second state in the second light modulation component includes 90 degrees or 45 degrees. That is, by controlling the deflection voltage, the deflection angle of the liquid crystal molecules in the light modulation regions 02 in the first state and the deflection angle of the liquid crystal molecules in the light modulation regions 02 in the second state are independently controlled, so that the second light modulation component 30 forms at least two light modulation regions 02 with a phase delay difference of 90 degrees or 45 degrees, thereby dynamically controlling the diffusion width of the halo, improving a dynamic image motion blur, and improving a display effect.

In one or more embodiments of the present application, a phase delay difference between light transmitted through a part of the light modulation regions 02 in the first state in the second light modulation component and light transmitted through a part of the light modulation regions 02 in the second state in the second light modulation component is less than or equal to $(n+½)*λ$, where n is an integer, and represents a wavelength.

In one or more embodiments of the present application, a direction of the light transmission axis of the second light modulation component 30 in the first state is perpendicular to a direction of the light transmission axis of the second light modulation component 30 in the second state, or an angle between the direction of the light transmission axis of the second light modulation component 30 in the first state and the direction of the light transmission axis of the second light modulation component 30 in the second state is 45 degrees.

In one or more embodiments of the present application, the plurality of light modulation regions 02 may be arranged in a first direction or in a second direction, and the first direction is perpendicular to the second direction. Specifically, the first direction and the second direction may be a row/column direction or a column/row direction in which the light-emitting devices 11 are arranged in the light-emitting substrate 10.

Figure 6:
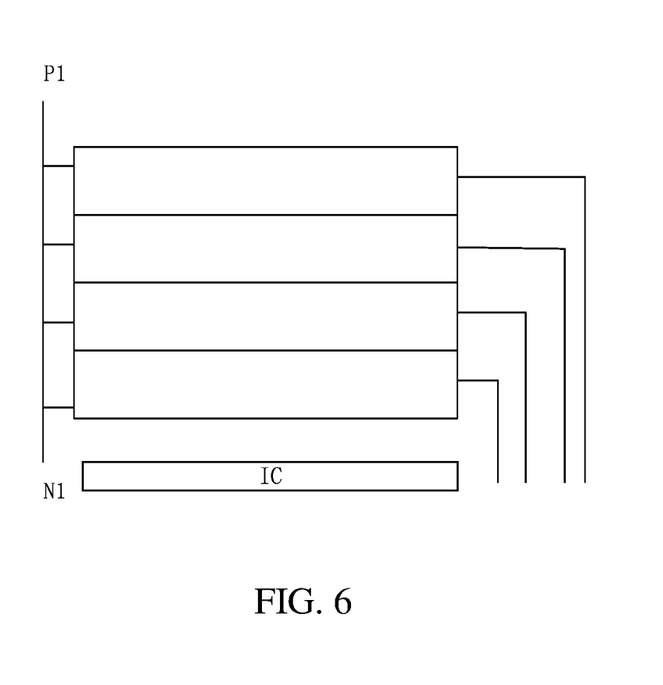
FIG. 6 is a schematic diagram of a drive architecture of the second light modulation component in the display module as shown in FIG. 3.

As shown in FIG. 6, the first light modulation component 20 is driven by using a driving chip integrated circuit (IC). Alternatively, two or more drive chip ICs may be used for driving.

Figure 7:
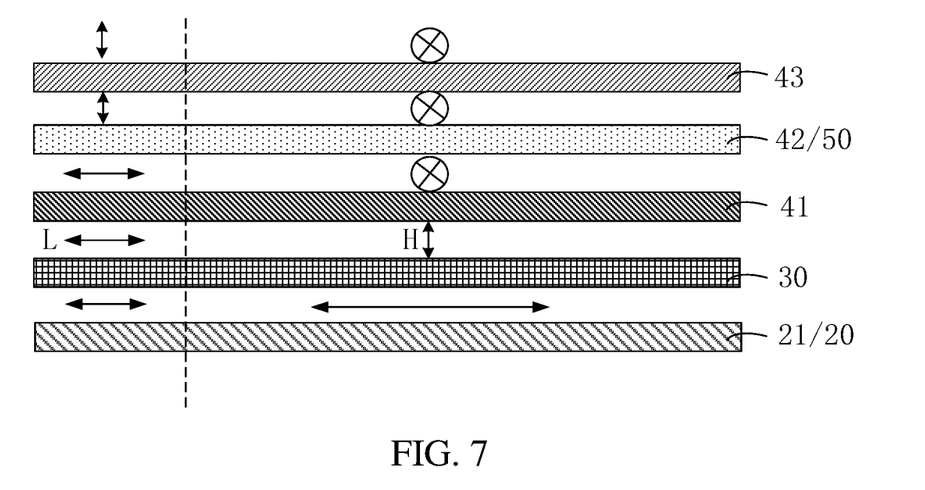
FIG. 7 is a schematic diagram of polarized light in the display module as shown in FIG. 3.

As shown in FIG. 7, the first polarizer 41 is disposed on a side of the array substrate 42 close to the light-emitting substrate 10. For example, the vibration direction of the first polarized light may be perpendicular to the vibration direction of the second polarized light. Specifically, the display module further includes an opposite substrate opposite to the array substrate 42. The second polarizer 43 is disposed on a side of the opposite substrate away from the first polarizer 41. A direction of a light transmission axis of the second polarizer 43 is parallel to a vibration direction of the second polarized light, that is, light transmitted from the second polarizer 43 is the second polarized light.

In one or more embodiments of the present application, a direction of the light transmission axis of the first polarizer 41 is parallel to a direction of the light transmission axis of the first light modulation component 20, so that the first polarized light L transmitted through the second light modulation component 30 may normally transmit through the first polarizer 41. The second polarized light H transmitted through the second light modulation component 30 is absorbed by the first polarizer 41 and cannot transmit through the first polarizer 41. A direction of the light transmission axis of the second polarizer 43 is perpendicular to a direction of the light transmission axis of the first polarizer 41, so that the second polarized light H transmitted through the liquid crystal cell 50 may be transmitted through the second polarizer 43 for display. Both the first polarized light L and the second polarized light H are linearly polarized light. By controlling the transmission of the second polarized light H transmitted by the light modulation regions 02 in the second state, the diffusion width of the halo is dynamically controlled, so that a dynamic image motion blur is improved, and a display effect is improved.

Figure 8:
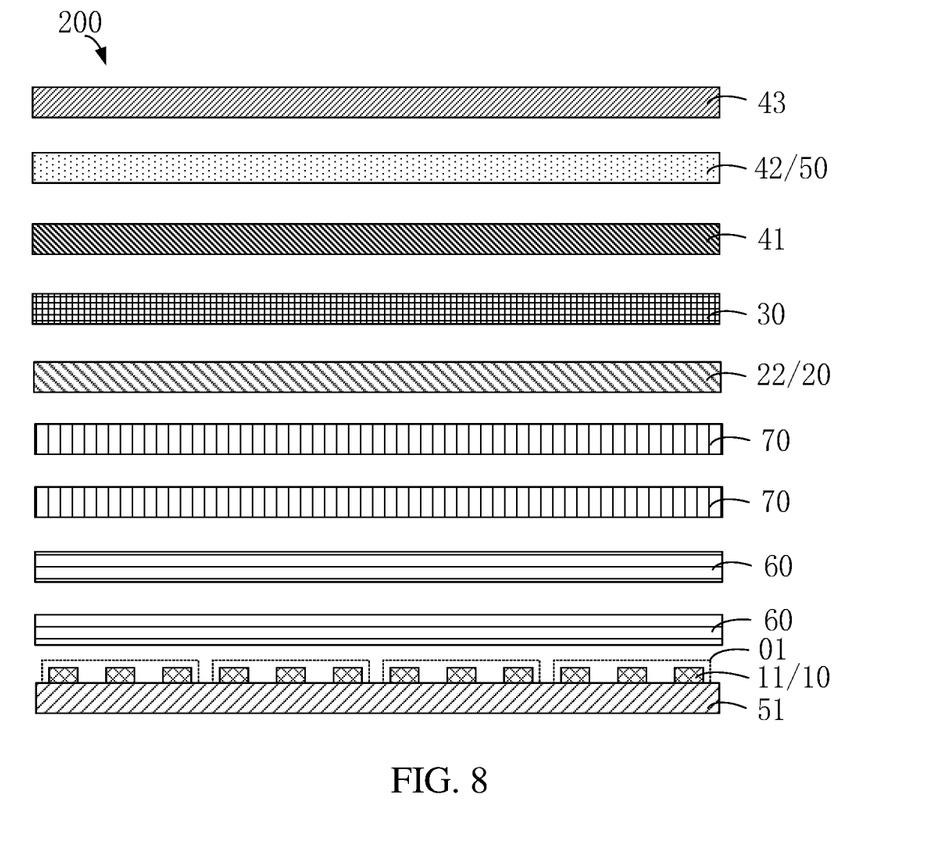
FIG. 8 is a schematic diagram of a display module of a second structure according to one or more embodiments of the present application.

As shown in FIG. 8, one or more embodiments of the present application provides a display module 200. A difference between the display module 200 and the display module 100 is as follows: a first light modulation component 20 in the display module 200 includes an advanced polarizer film (APF) 22, and the APF 22 is a linear reflective polarizer having an absorption axis along a width direction and a transmission axis along a length direction. The light transmitted from the APF 22 is a first polarized light. That is, the direction of the light transmission axis of the APF 22 is parallel to the vibration direction of the first polarized light.

In one or more embodiments of the present application, the first polarizer 41 is disposed on a side of the second light modulation component 30 away from the light-emitting substrate 10. For example, the vibration direction of the first polarized light may be perpendicular to the vibration direction of the second polarized light. Specifically, the display module further includes an opposite substrate opposite to the array substrate 42. The second polarizer 43 is disposed on a side of the opposite substrate away from the first polarizer 41. A direction of a light transmission axis of the second polarizer 43 is parallel to a vibration direction of the second polarized light, that is, light transmitted from the second polarizer 43 is the second polarized light.

Other structure of the display module 200 is the same as that of the display module 100.

Figure 9:
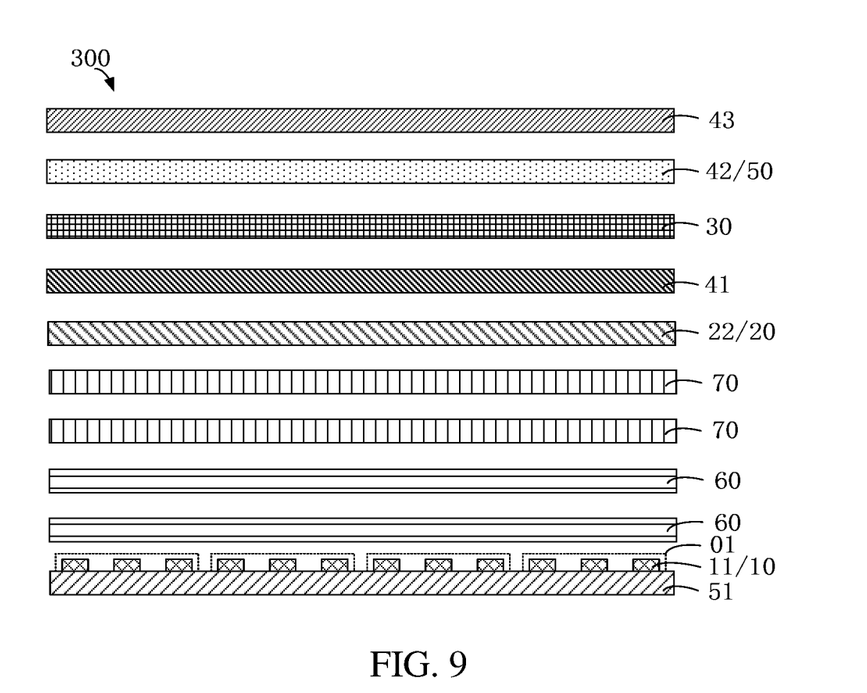
FIG. 9 is a schematic diagram of a display module of a third structure according to one or more embodiments of the present application.

As shown in FIG. 9, one or more embodiments of the present application provides a display module 300. A difference between the display module 300 and the display module 100 is as follows: in the display module 300, a first polarizer 41 is disposed on a side of the first light modulation component away from the light-emitting substrate 10, and a second light modulation component is disposed on a side of the first polarizer away from the light-emitting substrate 10. Specifically, the display module further includes an opposite substrate opposite to the array substrate 42. The second polarizer 43 is disposed on a side of the opposite substrate away from the first polarizer 41.

In one or more embodiments of the present application, the first light modulation component in the display module 300 includes an advanced polarizer film (APF) 22, and the advanced polarizer film is a linear reflective polarizer having an absorption axis along a width direction and a transmission axis along a length direction. The light transmitted from the APF 22 is the first polarized light. That is, the direction of the light transmission axis of the APF 22 is parallel to the vibration direction of the first polarized light.

Other structure of the display module 300 is the same as that of the display module 100.

Figure 10:
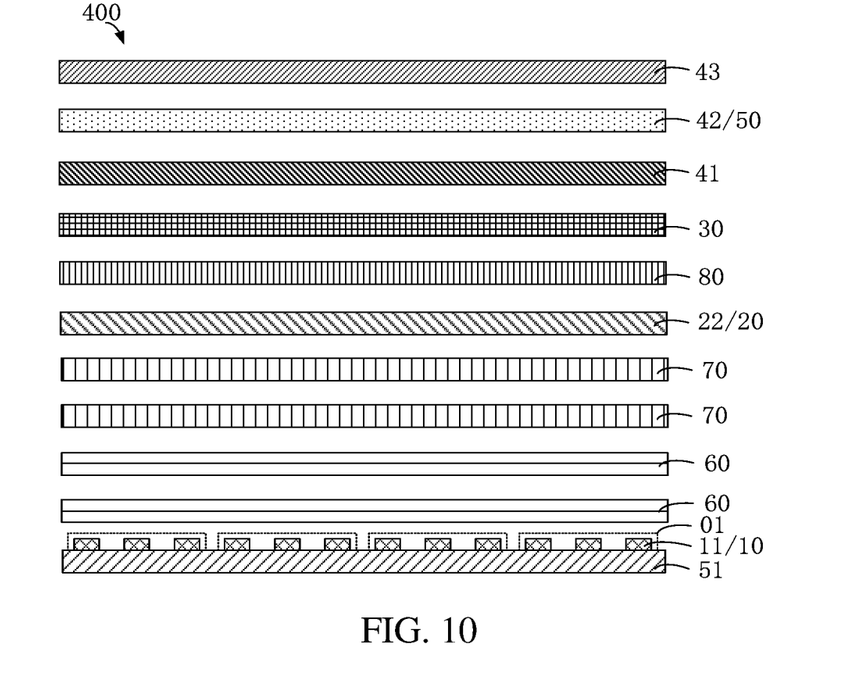
FIG. 10 is a schematic diagram of a display module of a fourth structure according to one or more embodiments of the present application.

As shown in FIG. 10, one or more embodiments of the present application provides a display module 400. A difference between the display module 400 and the display module 200/300 is that the display module 400 further includes an advanced light control film (ALCF) 80. The ALCF controls an exit angle of light, so that light with a large angle cannot be emitted, and only light with a small angle (less than 60 degrees) can be emitted. The ALCF 80 is disposed on a side of the first light modulation component 20 away from the light-emitting substrate.

In the display module 400, the second light modulation component 30 is disposed on a side of the ALCF 80 away from the light-emitting substrate 10. The first polarizer 41 is disposed on a side of the second light modulation component 30 away from the light-emitting substrate 10. Specifically, the display module further includes an opposite substrate opposite to the array substrate 42. The second polarizer 43 is disposed on a side of the opposite substrate away from the first polarizer 41.

Other structure of the display module 400 is the same as that of the display module 200/300.

Figure 11:
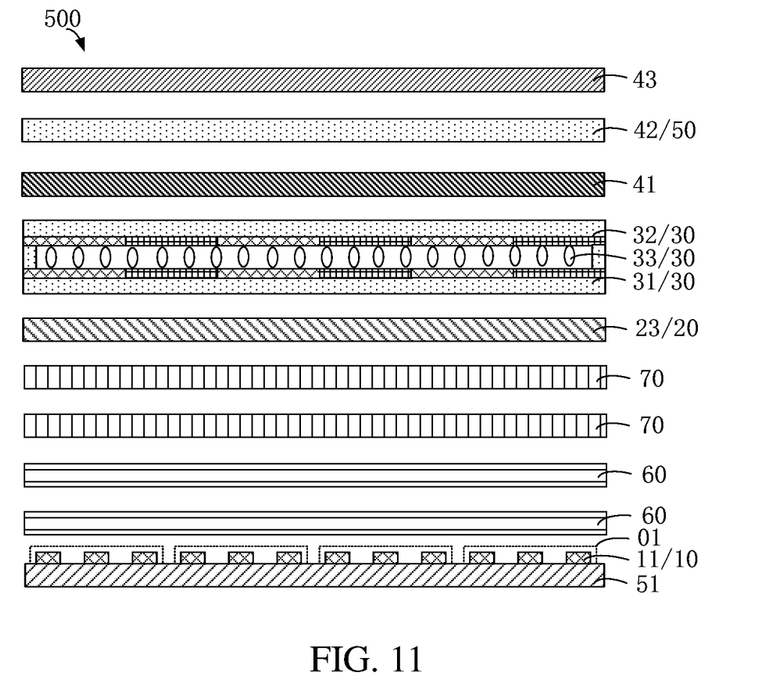
FIG. 11 is a schematic diagram of a display module of a fifth structure according to one or more embodiments of the present application.

As shown in FIG. 11, one or more embodiments of the present application provides a display module 500. A difference between the display module 500 and the display module 100 is as follows: the display module 500 further includes a third polarizer 23, and the third polarizer 23 is disposed on a side of the second light modulation component close to the light-emitting substrate 100. The light transmitted from the third polarizer 23 is first polarized light. That is, the direction of the light transmission axis of the third polarizer 23 is parallel to the vibration direction of the first polarized light.

In one or more embodiments of the present application, the second light modulation component 30 is a light modulation panel. The light modulation panel includes a first substrate 31, a second substrate 32, and a liquid crystal layer 33. The first substrate 31 is disposed opposite to the second substrate 32, and the liquid crystal layer 33 is disposed between the first substrate 31 and the second substrate 32. A first electrode layer 31 is disposed on the first substrate 31, a second electrode layer 32 is disposed on the second substrate 32, and liquid crystal molecules in the liquid crystal layer 33 deflect under an electric field formed by the first electrode layer 31 and the second electrode layer 32, so as to adjust and control light. Both the first electrode layer 31 and the second electrode layer 32 include a plurality of transparent electrodes. The transparent electrodes located in different light modulation regions 02 are respectively connected to different voltage output terminals, and the voltage output terminals are configured to output a deflection voltage to the transparent electrodes. Therefore, the deflection angle of the liquid crystal molecules in each light modulation regions is independently controlled, so as to dynamically control the diffusion width of the halo, improve a dynamic image motion blur, and improve a display effect. Specifically, transparent electrodes located in a same light modulation region are connected to a same voltage output terminal.

In one or more embodiments of the present application, the light modulation panel includes a plurality of light modulation regions. The light modulation regions have a first state and a second state. When the light-emitting region is in a light-emitting state, the light modulation region corresponding to the light-emitting region is in a first state. When the light-emitting region is in an extinguishing state, the light modulation region corresponding to the light-emitting region is in a second state. Under control of a deflection voltage, a phase delay difference between a part of the light modulation region 02 in the first state in the second light modulation component and a part of the light modulation region 02 in the second state in the second light modulation component includes 90 degrees or 45 degrees. That is, by controlling the deflection voltage, the deflection angle of the liquid crystal molecules in the light modulation region in the first state and the deflection angle of the liquid crystal molecules in the light modulation region in the second state are independently controlled, so that the second light modulation component 30 forms at least two light modulation regions with a phase delay difference of 90 degrees or 45 degrees. Thus, the diffusion width of the halo is dynamically controlled, a dynamic image motion blur is improved and a display effect is improved.

In one or more embodiments of the present application, the first polarizer 41 is disposed on a side of the second light modulation component 30 away from the light-emitting substrate 10. Specifically, the first polarizer 41 is disposed on a side of the light modulation panel away from the light-emitting substrate 10. The display module includes a liquid crystal cell 50, and the liquid crystal cell 50 includes an array substrate 42, a liquid crystal layer, and an opposite substrate opposite to the array substrate 42. The liquid crystal cell 50 is disposed on a side of the first polarizer 41 away from the light-emitting substrate 10. The liquid crystal cell 50 is configured to convert the first polarized light into the second polarized light. For example, the vibration direction of the first polarized light may be perpendicular to the vibration direction of the second polarized light. The liquid crystal cell 50 converts the first polarized light into the second polarized light. The second polarizer 43 is disposed on a side of the liquid crystal cell 50 away from the first polarizer 41. A direction of a light transmission axis of the second polarizer 43 is parallel to a vibration direction of the second polarized light, that is, light transmitted from the second polarizer 43 is the second polarized light.

In one or more embodiments of the present application, the light-emitting substrate 10 includes a plurality of light-emitting devices 11 arranged in an array, and the light-emitting devices 11 include a light-emitting diode or a mini light-emitting diode.

In one or more embodiments of the present application, the display module further includes a lamp board 51, a diffuser 60, and a brightness enhancement film 70. The light-emitting substrate 10 is located on one side of the lamp board 51. The lamp board 51 is configured to carry the light-emitting substrate 10. The diffuser 60 is disposed on a light exit side of the light-emitting substrate 10, and the brightness enhancement film 70 is disposed on a side of the diffuser 60 away from the light-emitting substrate 10. Both the diffuser 60 and the brightness enhancement film 70 are provided with two superimposed layers.

Figure 12:
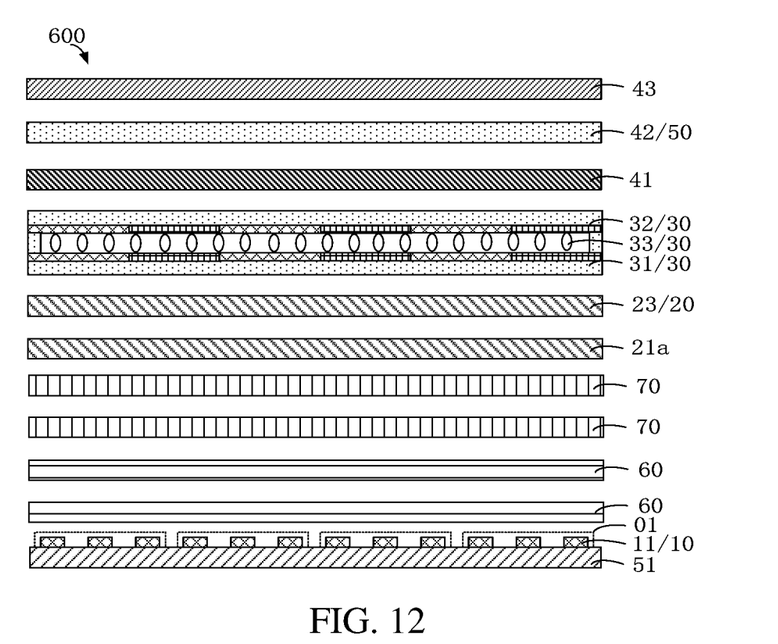
FIG. 12 is a schematic diagram of a display module of a sixth structure according to one or more embodiments of the present application.

As shown in FIG. 12, one or more embodiments of the present application provides a display module 600. A difference between the display module 600 and the display module 500 is as follows: the display module 600 further includes a dual brightness enhancement film 21a. The dual brightness enhancement film 21a is disposed on a side of the first light modulation component 20 close to the light-emitting substrate 10. The dual brightness enhancement film 21a is configured to convert light from a display light provided by the light-emitting substrate 10 whose vibration direction is perpendicular to a light transmission axis of the DBEF 21a into first polarized light.

Other structure of the display module 600 is the same as that of the display module 500.

Figure 13:
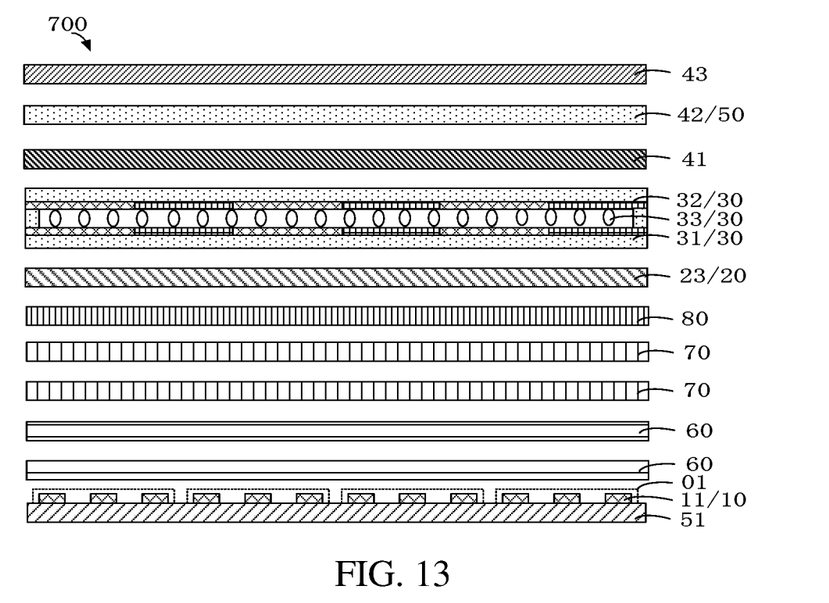
FIG. 13 is a schematic diagram of a display module of a seventh structure according to one or more embodiments of the present application.

As shown in FIG. 13, one or more embodiments of the present application provides a display module 700. A difference between the display module 700 and the display module 500 is as follows: the display module 700 further includes an advanced light control film 80, and the advanced light control film 80 is disposed on a side of the first light modulation component close to the light-emitting substrate 10.

Other structure of the display module 700 is the same as that of the display module 500.

Figure 14:
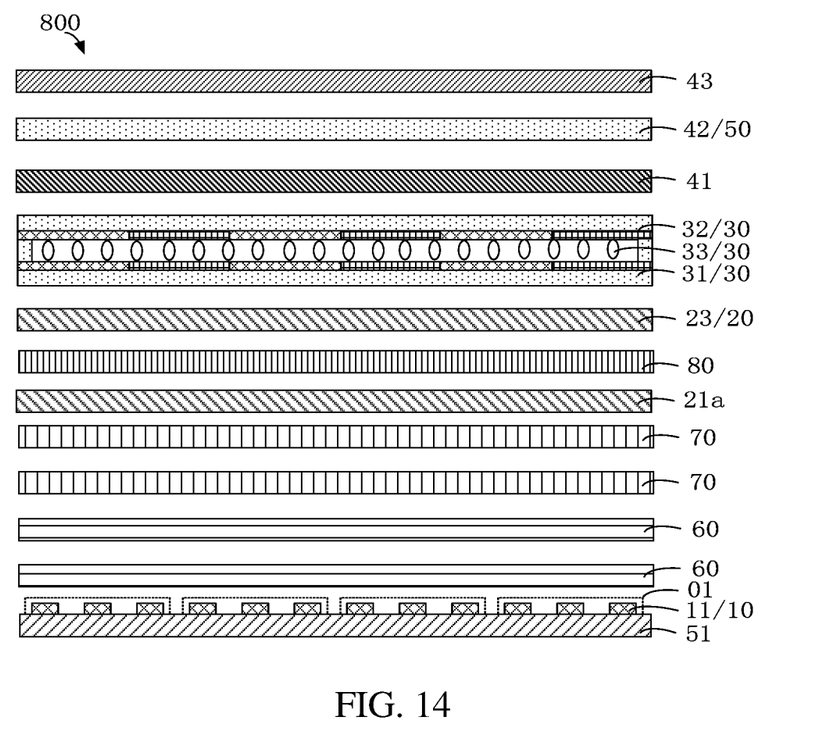
FIG. 14 is a schematic diagram of a display module of an eighth structure according to one or more embodiments of the present application.

As shown in FIG. 14, one or more embodiments of the present application provides a display module 800. A difference between the display module 800 and the display module 500 is as follows: the display module 800 further includes a DBEF 21a and an advanced light control film 80. The DBEF 21a is disposed on a side of the first light modulation component 20 close to the light-emitting substrate 10. The DBEF 21a is configured to convert light from a display light provided by the light-emitting substrate 10 whose vibration direction is perpendicular to a light transmission axis of the DBEF 21a into first polarized light. The advanced light control film 80 is disposed on a side of the DBEF 21a away from the light-emitting substrate 10.

Other structure of the display module 800 is the same as that of the display module 500.

Figure 15:
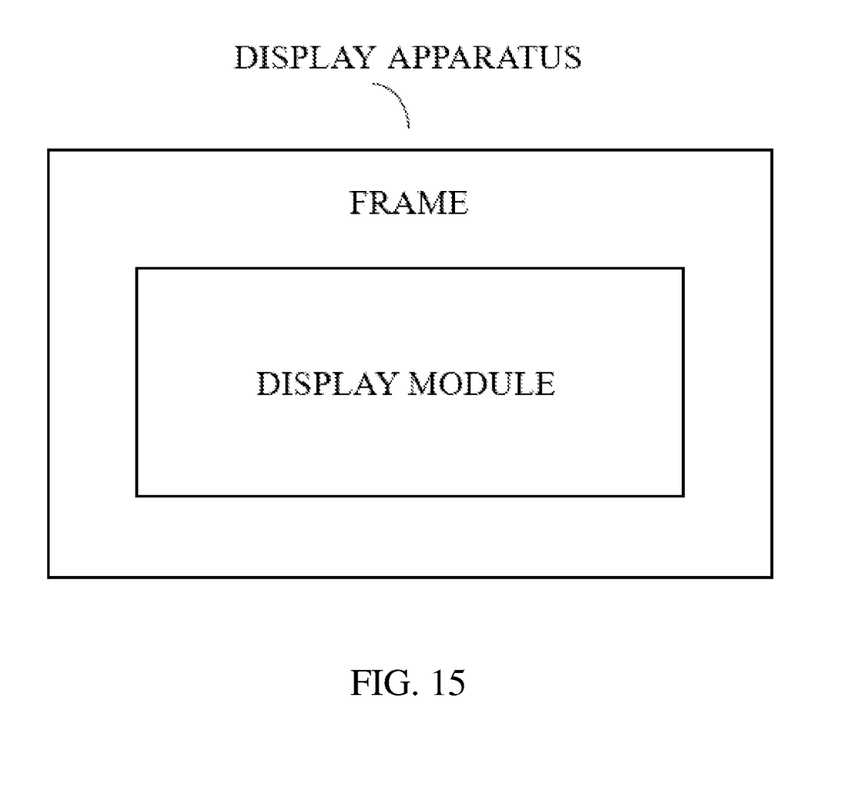
FIG. 15 is a schematic diagram of a display apparatus according to one or more embodiments of the present application.

According to another aspect, one or more embodiments of the present application provide a display apparatus. As shown in FIG. 15, the display apparatus may include the display module as described above and a frame. The display module is disposed in the frame.

Some embodiments of the present application have been described in detail above. The description of the above embodiments merely aims to help to understand the present application. Many modifications or equivalent substitutions with respect to the embodiments may occur to those of ordinary skill in the art based on the present application. Thus, these modifications or equivalent substitutions shall fall within the scope of the present application.

What is claimed is:

1. A display module, comprising:
   a light-emitting substrate having a plurality of light-emitting regions;
   a first light modulation component disposed on a light exit side of the light-emitting substrate, wherein light transmitted from the first light modulation component is first polarized light;
   a second light modulation component disposed on a side of the first light modulation component away from the light-emitting substrate, wherein the second light modulation component has a plurality of light modulation regions disposed respectively corresponding to the light-emitting regions, light transmitted from one or more of the light modulation regions respectively corresponding to one or more of the light-emitting regions in a extinguishing state is second polarized light, and light transmitted from one or more of the light modulation regions respectively corresponding to one or more of the light-emitting regions in a light-emitting state is third polarized light;
   an array substrate disposed on a side of the second light modulation component away from the first light modulation component; and
   a first polarizer disposed on the side of the second light modulation component away from the first light modulation component,
   wherein a vibration direction of the first polarized light is not parallel to a vibration direction of the second polarized light and is parallel to a vibration direction of the third polarized light, and the vibration direction of the second polarized light is not parallel to a polarization direction of the first polarizer.

2. The display module according to claim 1, wherein the second light modulation component comprises a first electrode layer, a second electrode layer, and a liquid crystal layer, the first electrode layer is disposed opposite to the second electrode layer, and the liquid crystal layer is disposed between the first electrode layer and the second electrode layer.

3. The display module according to claim 2, wherein each of the first electrode layer and the second electrode layer comprises a plurality of transparent electrodes, and ones of the transparent electrodes respectively located in ones of the light modulation regions are respectively connected to different voltage output terminals.

4. The display module according to claim 3, wherein the one or more of the light modulation regions respectively corresponding to the one or more of the light-emitting regions in the light-emitting state are in a first state, and the one or more of the light modulation regions respectively corresponding to the one or more of the light-emitting regions in the extinguishing state are in a second state, and
   under control of deflection voltages respectively from the voltage output terminals, a phase delay difference between a part of the light modulation regions in the first state and a part of the light modulation regions in the second state is of one of 90 degrees and 45 degrees.

5. The display module according to claim 1, wherein the first polarizer is disposed on one of:
   a side of the array substrate close to the second light modulation component; and
   a side of the array substrate away from the second light modulation component.

6. The display module according to claim 5, further comprising at least one of:
   a dual brightness enhancement film disposed on a side of the first light modulation component close to the light-emitting substrate, wherein light transmitted from the dual brightness enhancement film is the first polarized light; or
   an advanced light control film disposed on the side of the first light modulation component close to the light-emitting substrate or disposed on a side of the dual brightness enhancement film away from the light-emitting substrate.

7. The display module according to claim 6, further comprising a second polarizer and a third polarizer,
   wherein the second polarizer and the first polarizer are respectively disposed on opposite sides of the array substrate, and the third polarizer is disposed on a side of the second light modulation component close to the light-emitting substrate.

8. The display module according to claim 1, wherein the vibration direction of the first polarized light is perpendicular to the vibration direction of the second polarized light, and the vibration direction of the second polarized light is perpendicular to the polarization direction of the first polarizer.

9. The display module according to claim 1, wherein the first light modulation component comprises a dual brightness enhancement film, and light transmitted from the dual brightness enhancement film is the first polarized light.

10. The display module according to claim 1, wherein the first light modulation component comprises an advanced polarizer film, and light transmitted from the advanced polarizer film is the first polarized light.

11. The display module according to claim 10, wherein the display module further comprises an advanced light control film disposed on a side of the first light modulation component away from the light-emitting substrate.

12. The display module according to claim 1, further comprising a diffuser and a brightness enhancement film, wherein the diffuser is disposed on the light exit side of the light-emitting substrate, and the brightness enhancement film is disposed on a side of the diffuser away from the light-emitting substrate.

13. A display apparatus, comprising a frame and a display module disposed in the frame, the display module comprising:
   a light-emitting substrate having a plurality of light-emitting regions;
   a first light modulation component disposed on a light exit side of the light-emitting substrate, wherein light transmitted from the first light modulation component is first polarized light;
   a second light modulation component disposed on a side of the first light modulation component away from the light-emitting substrate, wherein the second light modulation component has a plurality of light modulation regions disposed respectively corresponding to the light-emitting regions, light transmitted from one or more of the light modulation regions respectively corresponding to one or more of the light-emitting regions in a extinguishing state is second polarized light, and light transmitted from one or more of the light modulation regions respectively corresponding to one or more of the light-emitting regions in a light-emitting state is third polarized light;
   an array substrate disposed on a side of the second light modulation component away from the first light modulation component; and
   a first polarizer disposed on the side of the second light modulation component away from the first light modulation component,
   wherein a vibration direction of the first polarized light is not parallel to a vibration direction of the second polarized light and is parallel to a vibration direction of the third polarized light, and the vibration direction of the second polarized light is not parallel to a polarization direction of the first polarizer.

14. The display apparatus according to claim 13, wherein the second light modulation component comprises a first electrode layer, a second electrode layer, and a liquid crystal layer, the first electrode layer is disposed opposite to the second electrode layer, and the liquid crystal layer is disposed between the first electrode layer and the second electrode layer.

15. The display apparatus according to claim 14, wherein each of the first electrode layer and the second electrode layer comprises a plurality of transparent electrodes, and ones of the transparent electrodes respectively located in ones of the light modulation regions are respectively connected to different voltage output terminals.

16. The display apparatus according to claim 15, wherein the one or more of the light modulation regions respectively corresponding to the one or more of the light-emitting regions in the light-emitting state are in a first state, and the one or more of the light modulation regions respectively corresponding to the one or more of the light-emitting regions in the extinguishing state are in a second state, and
   under control of deflection voltages respectively from the voltage output terminals, a phase delay difference between a part of the light modulation regions in the first state and a part of the light modulation regions in the second state is of one of 90 degrees and 45 degrees.

17. The display apparatus according to claim 13, wherein the first polarizer is disposed on one of:
   a side of the array substrate close to the second light modulation component; and
   a side of the array substrate away from the second light modulation component.

18. The display apparatus according to claim 13, wherein the vibration direction of the first polarized light is perpendicular to the vibration direction of the second polarized light, and the vibration direction of the second polarized light is perpendicular to the polarization direction of the first polarizer.

19. The display apparatus according to claim 18, wherein the display module further comprises at least one of:
   a dual brightness enhancement film disposed on a side of the first light modulation component close to the light-emitting substrate, wherein light transmitted from the dual brightness enhancement film is the first polarized light; or
   an advanced light control film disposed on the side of the first light modulation component close to the light-emitting substrate or disposed on a side of the dual brightness enhancement film away from the light-emitting substrate.

20. The display apparatus according to claim 19, wherein the display module further comprises a second polarizer and a third polarizer,
   wherein the second polarizer and the first polarizer are respectively disposed on opposite sides of the array substrate, and the third polarizer is disposed on a side of the second light modulation component close to the light-emitting substrate.

* * * * *